United States Patent Office 3,082,176
Patented Mar. 19, 1963

3,082,176
RECOVERY OF ACRYLONITRILE CATALYST
Leo Walter Tyran, Lewiston, N.Y., assignor to E. I. du Pont de Nemours and Company, Wilmington, Del., a corporation of Delaware
No Drawing. Filed Nov. 12, 1959, Ser. No. 852,161
1 Claim. (Cl. 252—413)

This invention relates to a method for catalyst recovery from the reaction mixture formed in liquid phase production of acrylonitrile from acetylene and hydrogen cyanide, and is more particularly concerned with treatment of mixtures of anhydrous catalyst solutions of copper compounds in organic solvents and reaction by-products, formed in the production of acrylonitrile, to recover the copper values and solvents.

A well-known commercial process for producing acrylonitrile involves continuously passing hydrogen cyanide and acetylene through a reactor containing an aqueous solution of cuprous chloride catalyst at a temperature of 70°–100° C. The resulting liquid phase reaction produces a variety of by-products in addition to the desired acrylonitrile. The more volatile by-products pass out of the reactor with the acrylonitrile and unreacted hydrogen cyanide and acetylene. This off-gas passes to a recovery system where the acrylonitrile is separated and purified. A mixture of non-volatilized by-products accumulates in the reactor and will soon stop the process unless it is removed. This mixture of by-products is a dark, tarry material which is reasonably fluid at the reaction temperature but solidifies when cooled to room temperature. These tars are insoluble in water, so it is a relatively easy matter to separate them from an aqueous catalyst solution to avoid an excessive accumulation in the reaction system, as by draining the tar layer from the reactor.

The use of nonaqueous solutions of cuprous chloride in organic liquids is an improvement over the use of aqueous catalyst solutions because it reduces by-product formation, e.g., the formation of acetaldehyde by reaction of acetylene with water. Furthermore, anhydrous catalyst solutions of cuprous chloride in combinations of organic liquid solvent for cuprous chloride with certain organic liquid catalyst promoters, both being volatile at a higher temperature than the acrylonitrile produced so that product separation is readily effected, have been found which also provide important improvements in productivity, by greatly increasing the activity and useful life of the catalyst. However, the tarry by products formed are soluble in the organic liquids used. The by-products dilute the catalytic reaction medium, increase its viscosity, and cause the productivity per unit volume of catalyst to decrease when the concentration reaches about 20% of tar. The operation becomes uneconomical at tar concentrations approaching 30%. It is therefore necessary to replace catalyst medium to avoid an excessive concentration of dissolved tars, either continuously or intermittently, with fresh components at a rate which will remove undesirable amounts of tar from the system. The catalyst components of this used catalyst are too valuable to throw away with the tar.

It is an object of this invention to provide a process for recovering copper values and volatile organic liquids from used anhydrous catalyst solutions of copper compounds in organic solvents and reaction by-products resulting from use in the liquid phase production of acrylonitrile. Another object is to provide such a process for recovering these valuable components in a form suitable for reuse in making up catalyst solutions for the acrylonitrile process. Other objects will become apparent from the specification and claims.

In accordance with this invention, used nonaqueous acrylonitrile catalyst solutions of copper compounds in volatile organic liquid, containing dissolved reaction by-product tars resulting from use of the catalyst in the production of acrylonitrile from acetylene and hydrogen cyanide, are treated to separate volatile liquid and copper values by first evaporating volatile liquid from the solution and condensing the vapors to recover a major portion of the organic liquid for use in preparing fresh catalyst solution. It is possible to recover about 95% of the volatile catalyst liquid, i.e., solvent and any volatile organic catalyst promoter used. The desolvated residue of copper compounds and tars is digested with aqueous caustic soda to dissolve the tars and precipitate cuprous oxide, which is then separated from the tar solution. Preferably, prior to the digestion step, any copper compounds other than cuprous chloride are treated to convert them to cuprous chloride. In this way copper recoveries of better than 95% are obtained from used catalyst containing 10% to 30% of dissolved by-product tars.

If the desolvated catalyst mixture is digested with aqueous caustic soda without the treatment to convert the copper compounds to cuprous chloride, all of the copper present does not precipitate as cuprous oxide. This may reduce the recovery by about 10% or more, depending upon the amount of such other copper compounds in the used catalyst. It is believed that most of the copper present as cuprous cyanide or cyanide complexes is not converted to cuprous oxide by the digestion with aqueous caustic soda. By heating finely-divided, desolvated catalyst residue with hydrochloric acid containing 10% or more HCl, at a temperature below the fusion temperature of the tars, nearly 100% of the copper values are recovered as cuprous oxide in the subsequent digestion step. Treatment with more dilute hydrochloric acid, or with alkaline solutions of chloride salts such as sodium chloride, is less effective, but will also improve the recovery of copper values.

When the desolvated catalyst residue is heated to about 100° C. for one hour with slightly more than the theoretical amount of dilute aqueous NaOH, an amoniacal odor is given off, the tars dissolve (presumably as sodium carboxylate salts) to form a solution having a viscosity slightly greater than that of water, and most of the copper content is precipitated as $Cu_2O$. The precipitate is a finely-divided, reddish-brown solid which filters readily and is easily separated from the solution of tars. X-ray analyses indicate that there is no crystalline species other than $Cu_2O$ present, but the actual purity of this product will, of course, depend upon details of the procedure used. The purity will, in any case, be adequate for reuse as catalyst after conversion to cuprous chloride.

The cuprous oxide recovered by the above process is readily converted to cuprous chloride by treatment with hydrogen chloride gas at a temperature which will drive off the water formed in the reaction. The precipitated cuprous oxide is in finely-divided form and can readily be converted to cuprous chloride by treatment with HCl as by passing anhydrous HCl through it at a temperature of about 100°–200 C. The cuprous oxide can also be treated with HCl as a slurry in an anhydrous solvent or in water.

When a slurry of cuprous oxide in the catalyst solvent is treated with HCl, the resulting cuprous chloride-solvent composition is suitable for direct reuse as catalyst replacement in the acrylonitrile process.

The invention is further illustrated by the following examples of specific embodiments, wherein parts are by weight unless otherwise indicated:

*Example 1*

A catalyst solution used in the production of acrylonitrile and containing 22.9 parts CuCl, 11.4 parts CuCN, 44.9 parts volatile organic liquid and 20.8 parts by-product tars is heated under a reduced pressure of 25 mm. mercury, absolution, to evaporate the volatiles. With benzonitrile as the principal volatile component most of the volatiles distil off at a temperature of 96° C. The vapors are condensed to give a recovery of 91.8% of the volatile organic liquid in the used catalyst. The recovered liquid is generally suitable for preparing cuprous chloride catalyst solutions without further purification, but the components of the mixture can be separated by a conventional fractional distillation if desired.

The desolvated residue of copper compounds and tars is ground to a powder passing through a 20-mesh screen and heated with 25.5 parts of 18% aqueous HCl for 2 hours at 100° C. in a stirred vessel equipped with a reflux condenser. This is a slight excess of hydrochloric acid over the amount theoretically needed to convert the CuCN present to CuCl. The treated residue is then digested with 250 parts of 7% aqueous NaOH for 1 hour at 104° C. in a stirred vessel equipped with a reflux condenser. The amount of caustic used is about 20% in excess of that required to react with the copper compounds present. During the digestion an ammoniacal odor is given off, the tars are dissolved (presumably as sodium carboxylate salts) and a finely-divided, reddish-brown precipitate of $Cu_2O$ is formed. Oxidation to cupric oxide is avoided by excluding oxygen, as by carrying out the above treatments in an atmosphere of nitrogen.

The cuprous oxide is separated from the solution of tars by filtration and washing. X-ray analysis shows that the copper is all present in the form of $Cu_2O$. A recovery of 99.0% of the copper present initially in the used catalyst solution is obtained, and no copper is detectable in the filtrate of dissolved tars. The cuprous oxide is converted to cuprous chloride by passing anhydrous HCl through it at a temperature of 150° C. for 2 hours. Cuprous chloride is obtained in high yield in suitable form for reuse in acrylonitrile catalyst solutions.

*Example 2*

Example 1 is repeated except that the desolvated residue of copper compounds and tars is heated with 460 parts of 1% aqueous HCl for 2 hours at 100° C. to convert the CuCN to CuCl (instead of using 25.5 parts of 18% aqueous HCl). Digestion of the treated residue with 7% aqueous NaOH as before then results in a recovery of cuprous oxide corresponding to 94.4% of the copper initially present in the used catalyst solution. A cuprous chloride-benzonitrile catalyst is readily prepared from the recovered cuprous oxide for use as catalyst replacement in the acrylonitrile process. A slurry of 50 parts of cuprous oxide in 500 parts of benzonitrile is heated to 95° C. About 20 parts/hour of anhydrous HCl in about 175–350 parts/hour of nitrogen (by weight) are passed through the slurry for a period of 3½ hours. The mixture turns dark and the solid cuprous oxide apparently disappears. Upon cooling the solution, crystals of BN·CuCl complex separate in high yield. The crystals are collected by filtration and washed with acetone. X-ray analysis shows only the complex and free CuCl to be present.

*Example 3*

Example 1 is repeated except that, instead of treating the desolvated residue of copper compounds and tars with hydrochloric acid to destroy copper cyanide complexes, the treatment is combined with the step of digesting 7% aqueous NaOH by adding 25 parts of NaCl to the 250 parts of caustic solution. The digestion then results in a recovery of cuprous oxide corresponding to 92.8% of the copper initially present in the used catalyst solution. An amount of 25 parts $Cu_2O$ is dissolved in 200 parts of 18% aqueous HCl at room temperature to give a clear solution. Cuprous chloride precipitates when this solution is diluted by pouring it into water. The precipitated CuCl is collected by filtration, washed with dilute hydrochloric acid and then methanol, and dried in a vacuum oven. A 35.6% recovery of cuprous chloride is obtained in this way.

Since many different embodiments of the invention may be made without departing from the spirit and scope thereof, it is to be understood that the invention is not limited by the specific illustrations except to the extent defined in the following claim.

I claim:

The process for treating used nonaqueous catalyst solutions of cuprous chloride dissolved in benzonitrile solvent, said solution containing cuprous cyanide and 10% to 30% by weight of reaction by-product tars resulting from use of the catalyst solution in the production of acrylonitrile from acetylene and hydrogen cyanide, which comprises evaporating said benzonitrile solvent and condensing the vapors to recover most of the benzonitrile in said catalyst solution, heating the residue of copper compounds and tars in finely-divided form with hydrochloric acid containing at least 10% HCl at a temperature below the fusion temperature of the tars to convert cuprous cyanide to cuprous chloride, continuing the treatment until the conversion has been completed, digesting the treated residue at about 100° C. with slightly more than the theoretical amount of aqueous sodium hydroxide solution to dissolve the tars and precipitate cuprous oxide, continuing the digestion until the tars have dissolved, and separating the cuprous oxide from the solution of tars.

References Cited in the file of this patent

UNITED STATES PATENTS

| | | |
|---|---|---|
| 2,920,098 | Burrus et al. | Jan. 5, 1960 |
| 2,956,029 | Higgins et al. | Oct. 11, 1960 |